July 26, 1966     C. NADLER ETAL     3,263,012
DYE COMPOSITION
Original Filed Sept. 30, 1963
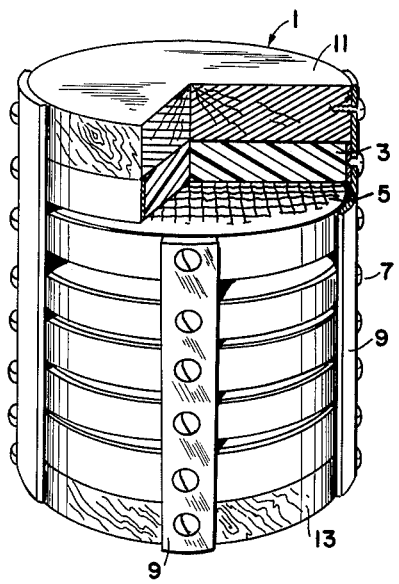
INVENTOR.
COLEMAN NADLER
HARRY T. HAEFELIN
BY
ATTORNEY

3,263,012
DYE COMPOSITION
Coleman Nadler, Philadelphia, and Harry T. Haefelin, Glenside, Pa., assignors to the United States of America as represented by the Secretary of the Navy
Original application Sept. 30, 1963, Ser. No. 312,796. Divided and this application Mar. 26, 1964, Ser. No. 355,133
1 Claim. (Cl. 264—234)

The invention described herein may be manufactured and used by or for the Government of the United States of America for governmental purposes without the payment of any royalties thereon or therefor.

This is a divisional application of my copending application Serial Number 312,796, filed September 30, 1963, now U.S. Patent No. 3,170,438.

This invention relates to a device and composition which will color water for at least thirty-five hours in order to indicate the position of crashed aircraft and survival personnel to searching aircraft in the event of an air-sea crash.

Currently, aircraft personnel are equipped with a seamarker which is attached to their life preservers. This marker comprises a cotton bag into which is placed a quantity of powdered sodium fluorescein dye, the bag being porous enough to allow water to seep through and to dissolve the fluorescein dye. The disadvantages of this device were as follows:

(1) The possibility of ripping the bag and thereby causing the dye content to drop through the hole in the bag.

(2) the possibility of the bag after a sufficient amount of water absorption has taken place, sinking to the bottom of the body of water into which it becomes immersed.

(3) The possibility of the dyestuff becoming caked due to moisture being absorbed by the bag from the air. Such caked dyestuff has poor solubility which results in an erratic release of color.

(4) The inability of this marking device to be effective beyond forty-five minutes after immersion.

In addition to these obvious disadvantages, the diffusion of the dye through the cotton bag provides for no control whatsoever over the rate of solubility of the dye in the water.

A device for releasing a dye in water at a controlled rate was disclosed in a patent, No. 2,716,961, issued to Theodore B. Manhein and Joseph L. Castelli. The principle of this device was to form a resinous foam having a high degree of cell interconnection and to line the cellular walls of the foam with a water soluble dye. When the resinous foam was ejected into the sea, the dye would leach out from the walls and color the sea water. The main difficulty with this device was that no control of the emission of the dye from the walls of the foam existed once the foam was committed to the water. The only control over the rate of solubility of the dye existed in the selection of the cellular size of the foam. The larger the cells, the faster the rate of solubility. These foam devices were incapable of indicating the position of crashed aircraft for prolonged periods of time. In addition, this device was not amenable to containing large quantities of dye per unit volume of foam.

It is therefore an object of this invention to provide an improved device which through a diffusion process releases a dye into water at a controlled rate over a prolonged period of time.

Another object of this invention is to provide a dye release means which will not sink due to water absorption during use, whose effectiveness is not influenced by ripping or tearing.

Other objects and many of the attendant advantages of this invention will be readily appreciated as the same becomes better understood by reference to the following detailed description which is considered in connection with the accompanying drawing wherein:

FIG. 1 is a perspective view of one form of our invention containing a cut-away portion in the top thereof.

In accordance with the invention, the improved composition and the device which is adapted to be automatically ejected from a crashed aircraft include fluorescein, sodium fluorescein or other salts of fluorescein which are bound, separately or in combination, in a matrix of polyvinyl alcohol resin containing also glycerine and borax. The dye and the polyvinyl alcohol are molded or pressed into a cake. This cake is made relatively flat so that its thickness is small compared to its breadth.

The method of using this composition will be clearly understood by reference to the drawing illustrating a packet for supporting the cakes in the water.

In the drawing, the packet 1 comprises a plurality of cakes 3 which have been molded from the dye composition described in greater detail hereinafter. The cakes are supported upon screen or large mesh fabric containers, 5 which are held in spaced relationship from one another by screws 7 positioned a predetermined distance apart in the supporting members 9. The top 11 and bottom 13 of this particular packet is made of any suitable buoyant material such as balsa wood or the like. The dye composition may be molded, drilled, or cut into any shape to provide sufficient dye dispersing surface area consistent with the intended application. It is obvious that these layers may be disposed in any other suitable manner.

In addition to the geometry of the dye cakes 3, as stated hereinabove, the nature of their composition and the manner of their preparation also control the rate of solubility of the dye in the water.

The dye composition comprises a sodium fluorescein dye bound in a matrix of polyvinyl alcohol resin containing also glycerine and borax.

Polyvinyl alcohol is a colorless plastic made by the acidic or basic hydrolysis of a polyvinyl ester, usually the acetate. Completely hydrolyzed alcohol contains approximately 5% residual acetate groups. The physical properties and water resistance and compatibility with plasticizers are modified considerably by the extent of hydrolysis. The polyvinyl alcohol functions as a matrix for the dye and must have negligible solubility in cold water with a hydrolysis value of 99–100%. Use of a high molecular weight resin facilitates formation of a stronger matrix and permits retention of a large volume of dye material.

The glycerine functions to swell the polyvinyl alcohol resin and to dissolve the dye thereby permitting the dye to diffuse into the resin and to be encapsulated in the resin matrix. The glycerine in part controls the dye diffusion rate from the polyvinyl alcohol matrix into the water when the device is ejected into the sea. The more glycerine, the greater the emission of dye into the water. The borax aids in maintaining the cohesive strength of the resin matrix.

A preferred embodiment of our composition consists of:

4 parts by weight of sodium fluorescein
1 part by weight of polyvinyl alcohol (99–100% hydrolized)
1 part by weight of glycerine (95%)
0.12 part by weight of borax
0.3 part by weight of glycerine (30%)

In the preparation of these dye cakes, one part of 95% glycerine is added to one part of the polyvinyl alcohol and allowed to stand for at least 48 hours at room temperature. 4 parts by weight of sodium fluorescein is dry mixed with the borax and then mixed thoroughly with the resin glycerine material. 0.3 part by weight of 30% glycerine is incorporated into the mixture which causes it to mass. This mixture can then be molded or pressed at room temperature into suitable sized cohesive cakes. These cakes are then oven heated for 20 hours at 212° F. This heating step also aids in developing the proper resin matrix-dye structure and also reduces the water sensitivity of the resin. This baking step contributes to the slow diffusion of dye when the composition is immersed into water. An increase in the baking time/or temperature results in slower diffusion of the dye. The resultant dye cake is very tough and is not prone to crumbling or shattering. The surface of the cake is dusted with polyvinyl alcohol resin to keep it dry and tack free.

We have made cakes that have emitted dye for periods of time ranging from 8 hours to 35 hours by varying either the polyvinyl alcohol-dye ratio or the glycerine content or the heat treatment of the mixture. This control over the solubility of the dye possessed by this device is the new and unexpected result not possessed by any previous devices. The following examples are cited to illustrate this feature of the invention:

*Example I*

4 parts by weight of sodium fluorescein
1 part by weight of polyvinyl alcohol
1.4 parts by weight of glycerine (95%)
0.12 part by weight of borax This cake was baked for 4 hours at 250° F. When this cake was immersed in water, it emitted dye for a period of 20 hours.

*Example II*

4 parts by weight of sodium fluorescein
1 part by weight of polyvinyl alcohol
1.1 parts by weight of glycerine (95%)
0.12 part by weight of borax Example II was baked for 20 hours at 212° F. This cake immersed dye for thirty-five hours when placed in water.

*Example III*

4 parts by weight of sodium fluorescein
1 part by weight of polyvinyl alcohol
1.6 parts by weight of glycerine (95%)
0.12 part by weight of borax Example III was baked for 20 hours at 212° F. Because of the increase in the amount of glycerine in the composition, this cake only emitted dye for twenty-four hours when placed in water.

*Example IV*

5 parts by weight of sodium fluorescein
1 part by weight of polyvinyl alcohol
1.4 parts by weight of glycerine (95%)
0.12 part by weight of borax This example was baked for 20 hours at 212° F. It emitted dye for only 8 hours because the critical ratio between the dye and the alcohol had been exceeded.

The dye concentration should not be less than 3 parts by weight nor more than 5 parts by weight; the polyvinyl alcohol concentration should not be less than 0.75 part by weight nor more than 1.5 parts by weight; the glycerine should not be less than 0.8 part by weight nor more than 1.8 parts by weight; the borax should not exceed 0.15 part by weight and the water should not exceed 1 part by weight. The baking temperature should be limited to at least 1 hour at 212° F. and not more than 4 hours at 250° F., otherwise the cake will either be too soft and crumble or be too hard to give the desired results.

Actual trial tests were conducted with the preferred embodiment of this invention in the Atlantic Ocean, 2 miles east of Manasquan Inlet, New Jersey. In a simulated air-sea rescue operation, the assemblage 1 was anchored in the water carrying 6 cakes of our preferred embodiment. After one hour, a dye slick measuring 400 yards long and 50 feet wide could be observed in the water from a height of 2000' above the water. After twenty-four hours, the dye slick measured 150 yards long and 5 feet wide and was still readily detectable from the air.

Obviously, many modifications and variations of the present invention are possible in the light of the above teachings. It is therefore to be understood that within the scope of the appended claim, the invention may be practiced otherwise than as specifically described.

What is claimed is:

A method for making a dye emitting cake which by the nature of its composition is able to control the rate of emission of the dye from the cake, said method comprising the following steps:
(a) mixing from 0.8 to 1.8 parts by weight of glycerine with 0.75 to 1.5 parts by weight of polyvinyl alcohol;
(b) permitting the mixture to stand for 48 hours at room temperature;
(c) dry mixing from 3 to 5 parts by weight of sodium fluorescein with no more than 0.12 part by weight of borax;
(d) adding the sodium fluorescein borax mixture to the polyvinyl-alcohol mixture;
(e) pressing the resulting mixture into cakes;
(f) heat treating the cakes from 1 to 4 hours at temperatures ranging from 212 to 250° F. respectively.

References Cited by the Examiner

UNITED STATES PATENTS 2,072,302   3/1937   Herrmann et al.
2,783,209   2/1957   Pessel _____ 252—301.3

ALEXANDER H. BRODMERKEL, *Primary Examiner.*

F. S. WHISENHUNT, *Assistant Examiner.*